United States Patent
Yu et al.

(10) Patent No.: US 8,934,746 B2
(45) Date of Patent: Jan. 13, 2015

(54) FLEXIBLE FLAT OPTICAL CABLE

(75) Inventors: Juhyun Yu, Mito (JP); Kouki Hirano, Hitachinaka (JP); Akihiro Hiruta, Hitachi (JP); Chihiro Ohkubo, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/336,479

(22) Filed: Dec. 23, 2011

(65) Prior Publication Data

US 2012/0207438 A1 Aug. 16, 2012

(30) Foreign Application Priority Data

Feb. 16, 2011 (JP) ................................. 2011-030763

(51) Int. Cl.
*G02B 6/44* (2006.01)
*G02B 6/43* (2006.01)
*G02B 6/42* (2006.01)

(52) U.S. Cl.
CPC ................ *G02B 6/43* (2013.01); *G02B 6/4214* (2013.01)
USPC ............ 385/101; 385/114; 385/105; 385/106

(58) Field of Classification Search
CPC ................................ G02B 6/43; G02B 6/4214
USPC .......................... 385/100–103, 105–106, 114
See application file for complete search history.

(56) References Cited

U.S. PATENT DOCUMENTS

| | | | | |
|---|---|---|---|---|
| 3,168,617 A | * | 2/1965 | Richter | .................... 174/117 FF |
| 5,630,003 A | * | 5/1997 | Arroyo | ......................... 385/113 |
| 6,107,577 A | * | 8/2000 | Sexton | ........................ 174/117 F |
| 2006/0050493 A1 | | 3/2006 | Hamasaki et al. | |
| 2007/0230863 A1 | | 10/2007 | Fukuda et al. | |
| 2008/0152286 A1 | | 6/2008 | Ueno et al. | |

FOREIGN PATENT DOCUMENTS

| | | |
|---|---|---|
| JP | 63-228528 A | 9/1988 |
| JP | 09-243885 | 9/1997 |
| JP | 63-24513 | 2/1998 |
| JP | 11-183739 | 7/1999 |

OTHER PUBLICATIONS

Japanese Office action dated Dec. 10, 2013 and English translation.

* cited by examiner

*Primary Examiner* — Ellen Kim
(74) *Attorney, Agent, or Firm* — Roberts Mlotkowski Safran & Cole P.C.

(57) ABSTRACT

A flexible flat optical cable includes two flexible base sheets, one or more optical fiber core wires arranged between the base sheets and each comprising at least an optical fiber, and an adhesive layer provided between the base sheets to bond the base sheets. A non-adhesive region is formed on a surface of the base sheets or the adhesive layer adjacent, in a thickness direction of the base sheets, to at least a portion of the optical fiber core wires for allowing a portion of the optical fiber core wires to move in a direction intersecting with an axial direction of the optical fiber core wires.

16 Claims, 14 Drawing Sheets

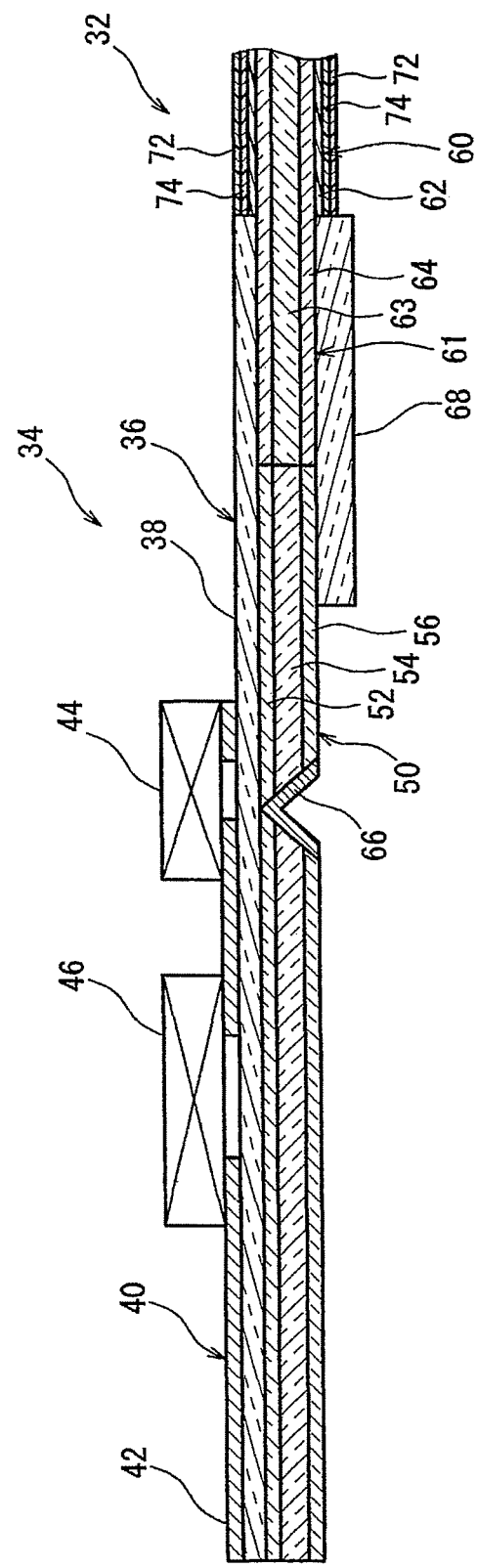

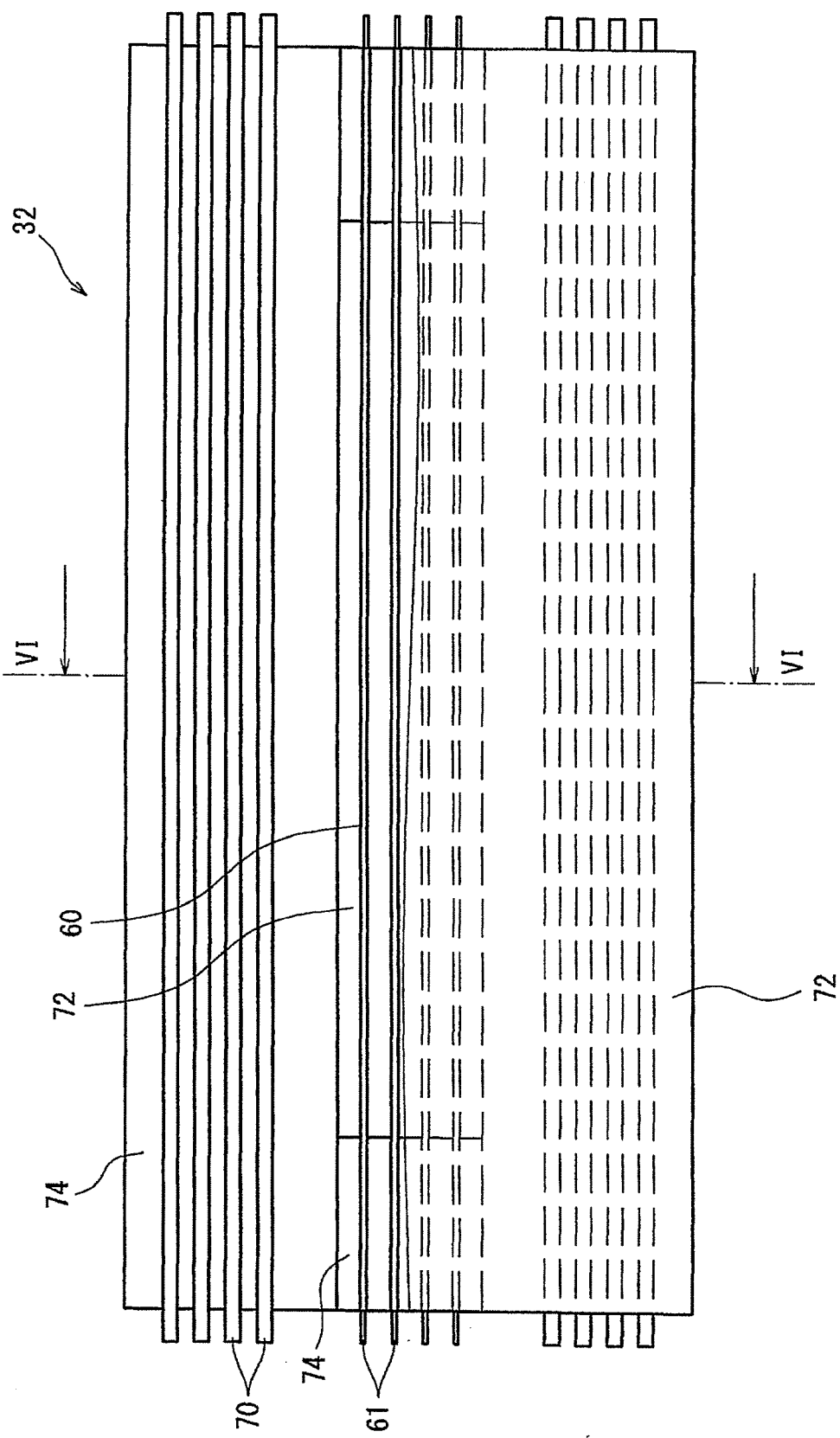

FIG.16A
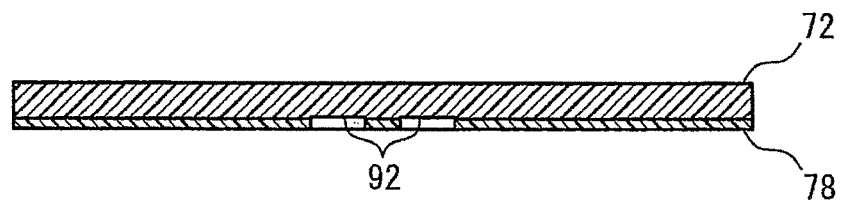
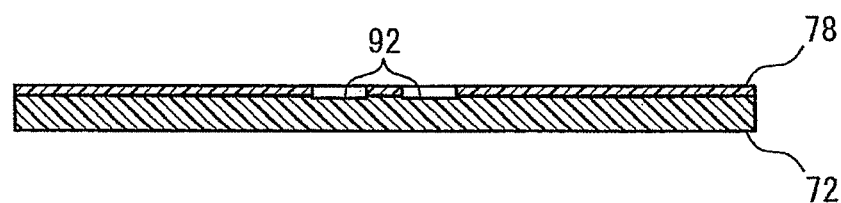
FIG.16B
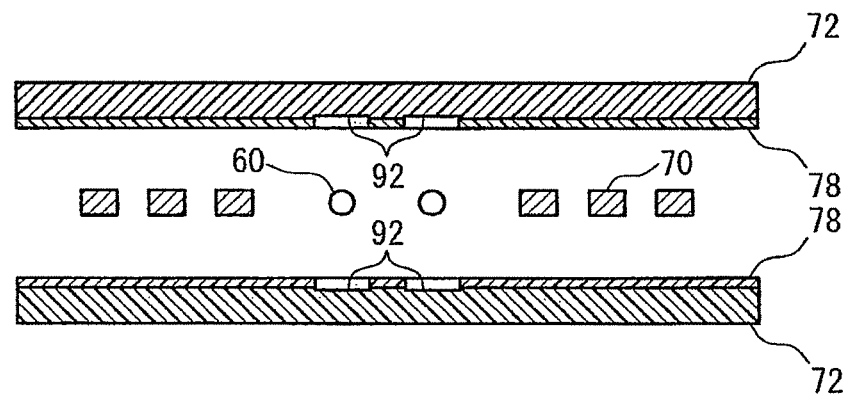

FLEXIBLE FLAT OPTICAL CABLE

The present application is based on Japanese Patent Application No. 2011-030763 filed on Feb. 16, 2011, the entire contents of which are incorporated herein by reference.

BACKGROUND OF THE INVENTION

1. Field of the Invention

The invention relates to a flexible flat optical cable.

2. Description of the Related Art

In recent years, a flexible flat optical cable (hereinafter also referred to as "FFOC") is used for wiring in various electronic devices.

As an example of FFOC, JP-A-S63-228528 discloses a flexible conductor that an optical fiber is buried in an insulating support of a flexible printed circuit board.

The FFOC needs to be positioned in electronic devices while being bent. However, the flexible conductor disclosed in JP-A-S63-228528 has a problem that, when it is bent to decrease a bend radius of the optical fiber at a bend portion, the optical fiber may be damaged.

SUMMARY OF THE INVENTION

It is an object of the invention to provide a highly reliable flexible flat optical cable that can prevent the damage of an optical fiber when being bent.

(1) According to one embodiment of the invention, a flexible flat optical cable comprises:

two flexible base sheets;

one or more optical fiber core wires arranged between the base sheets and each comprising at least an optical fiber; and an adhesive layer provided between the base sheets to bond the base sheets, wherein a non-adhesive region is formed on a surface of the base sheets or the adhesive layer adjacent, in a thickness direction of the base sheets, to at least a portion of the optical fiber core wires for allowing a portion of the optical fiber core wires to move in a direction intersecting with an axial direction of the optical fiber core wires.

In the above embodiment (1) of the invention, the following modifications and changes can be made.

(i) The non-adhesive region is formed directly on the surface of the base sheets.

(ii) The non-adhesive region is formed by a non-adhesive tape on the surface of the adhesive layer.

(iii) The non-adhesive region is formed by a tube surrounding a portion of the optical fiber core wires.

(iv) The optical fiber core wires extend outward from an end of the base sheets, and a part of the optical fiber core wires at the end of the base sheets is fixed by the adhesive layer.

(v) The flexible flat optical cable further comprises a conductor provided between the base sheets.

(vi) The flexible flat optical cable further comprises a shape retaining member provided between the base sheets to retain a shape of the base sheets.

(vii) The optical fiber core wires comprise a resin.

(viii) The non-adhesive region is divided into a plurality of zones in a longitudinal direction of the base sheets by the adhesive layer.

(ix) The optical fiber core wires disposed between the base sheets have a length greater than the base sheet.

(2) According to another embodiment of the invention, a flexible flat optical cable comprises:

two flexible base sheets;

one or more optical fiber core wires arranged between the base sheets and each comprising at least an optical fiber; and an adhesive layer provided between the base sheets to bond the base sheets each other, wherein a non-adhesive region is formed on a surface of the base sheets or the adhesive layer such that, when the optical fiber core wires are bent to have a bend portion therein, the non-adhesive region allows the bend portion to move in a width direction of the base sheets.

Points of the Invention

According to one embodiment of the invention, a flexible flat optical cable is constructed such that a bend portion of an optical fiber core wire is located in a non-adhesive region of a base sheet, and the non-adhesive region allows the bend portion of the optical fiber core wire to move in a width direction of the base sheet. Thereby, the bend portion of the optical fiber core wire can be curved with a bend radius more than that in case of not allowing the bend portion of the optical fiber core wire to move in the width direction of the base sheet. Due to the increased bend radius, stress can be prevented from concentrating on one place of the optical fiber core wire so as to protect the optical fiber from being damaged at the bend portion of the optical fiber core wire.

BRIEF DESCRIPTION OF THE DRAWINGS

Next, the present invention will be explained in more detail in conjunction with appended drawings, wherein:

FIG. 4 is a schematic cross sectional view showing a photoelectric conversion module in FIGS. 3A and 3B as well as a portion of the FFOC;

FIG. 5 is a schematic plan view showing the FFOC, wherein one of base sheets is partially removed;

FIGS. 7A and 7B are explanatory diagrams illustrating a method of manufacturing an FFOC, wherein FIG. 7A is a diagram illustrating a step of attaching adhesive tapes to base sheets and FIG. 7B is a diagram illustrating a step of sandwiching optical fiber core wires and conductors between the base sheets;

FIGS. 10A and 10B are explanatory diagrams illustrating a method of manufacturing the FFOC in FIG. 9, wherein FIG. 10A is a diagram illustrating a step of attaching non-adhesive tapes to base sheets and FIG. 10B is a diagram illustrating a step of sandwiching optical fiber core wires and conductors between the base sheets;

12A is a diagram illustrating a step of attaching non-adhesive tapes to base sheets and FIG. 12B is a diagram illustrating a step of sandwiching optical fiber core wires and conductors between the base sheets;

FIGS. 16A and 16B are explanatory diagrams illustrating a method of manufacturing the FFOC in FIG. 15, wherein FIG. 16A is a diagram illustrating a step of forming grooves on base sheets and FIG. 16B is a diagram illustrating a step of sandwiching optical fiber core wires and conductors between the base sheets;

DETAILED DESCRIPTION OF THE PREFERRED EMBODIMENTS

First Embodiment

A first embodiment of the invention will be described below in reference to the drawings.

Figure 1:
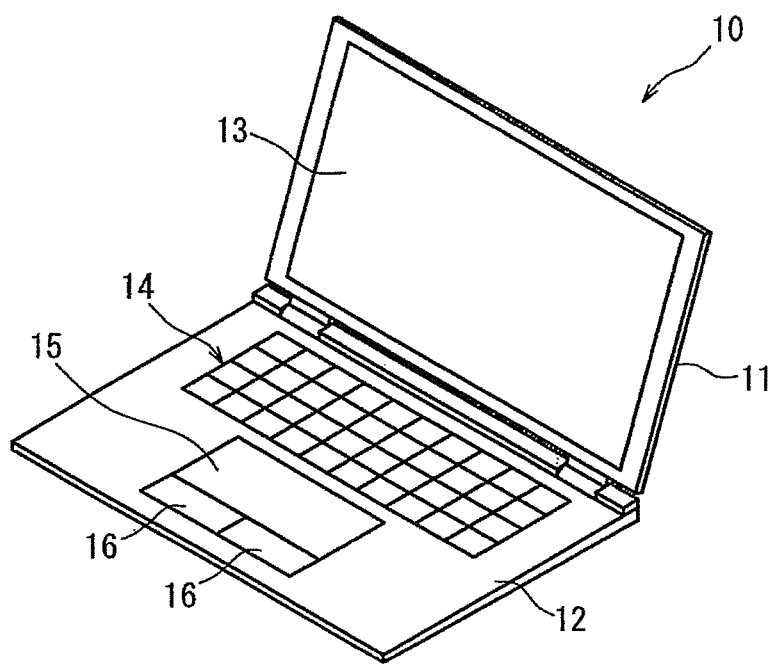
FIG. 1 is a schematic external perspective view showing a laptop computer provided with an FFOC in a first embodiment.

FIG. 1 is a schematic external perspective view showing a laptop computer 10 (notebook personal computer). The laptop computer 10 is, e.g., a fold-up computer in which a first case 11 is coupled to a second case 12 by a hinge. A liquid crystal panel 13 is installed on the first case 11 while a keyboard 14, a touchpad 15 and click buttons 16 are provided on the second case 12, and a user can obtain information from an image displayed on the liquid crystal panel 13.

Figure 2:
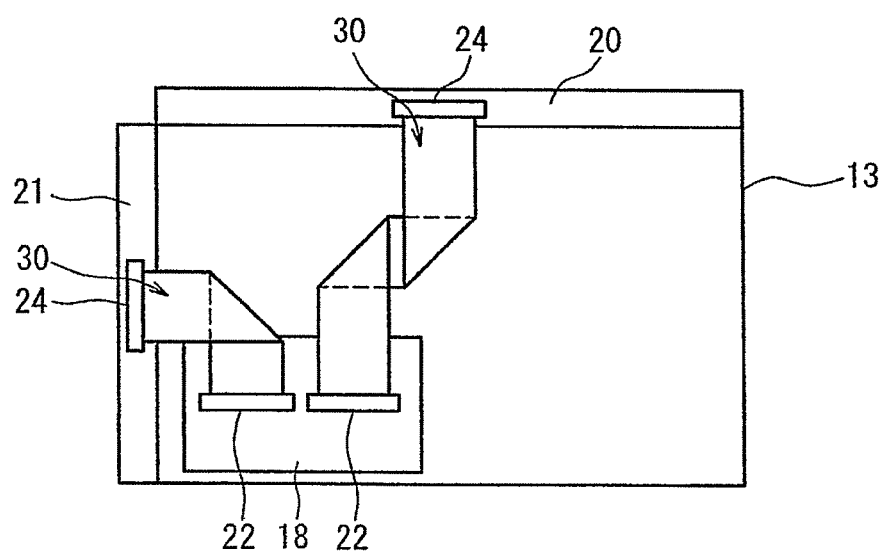
FIG. 2 is a schematic plan view showing a back side of a liquid crystal panel used for the laptop computer in FIG. 1, wherein a motherboard, a sub-board and an optical active flat cable are also shown.

FIG. 2 is a schematic plan view showing a back side of the liquid crystal panel 13 which is covered by the first case 11. A motherboard 18 is fixed to the back side of the liquid crystal panel 13.

An electrical component constituting a control circuit of the liquid crystal panel 13 is mounted on the motherboard 18 even though it is not illustrated. An arithmetic processing circuit and an image processing circuit, etc., are mounted inside the second case 12 even though they are not illustrated. The control circuit of the liquid crystal panel 13 receives an image data from the image processing circuit.

Sub-boards 20 and 21 are fixed to an outer rim of the liquid crystal panel 13, and an electrical component constituting a driver circuit of the liquid crystal panel 13 is mounted on the sub-boards 20 and 21 even though it is not illustrated. The driver circuit receives the image data from the control circuit and displays an image on the liquid crystal panel 13 based on the image data.

Connectors 22 and 24 are respectively provided on the motherboard 18 and on the sub-boards 20, 21 to transfer the image data, and both ends of optical active flat cables 30, are connected to the connectors 22 and 24.

Optical Active Flat Cable

Figure 3A:
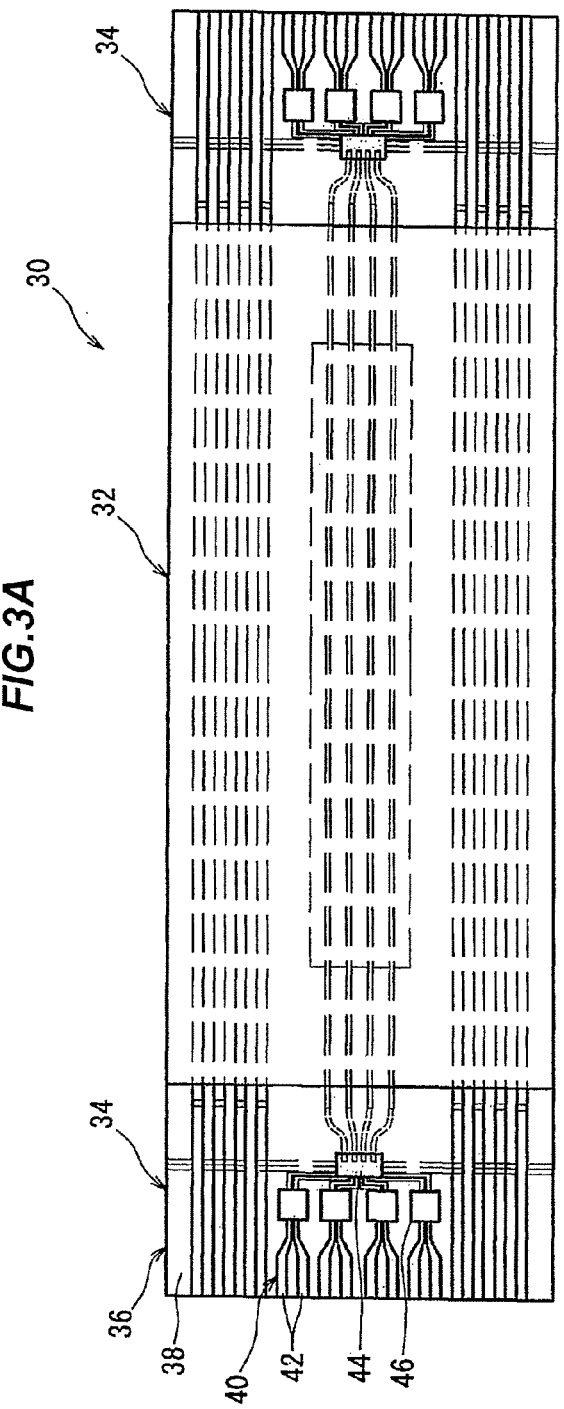
FIG. 3A is a schematic plan view showing the optical active flat cable in FIG. 2
Figure 3B:
FIG. 3B is a schematic side view thereof.

FIG. 3A is a schematic plan view showing the optical active flat cable (OAFC) 30 and FIG. 3B is a schematic side view showing the OAFC 30.

The OAFC 30 is composed of a flexible flat optical cable (FFOC) 32 in the first embodiment of the invention and photoelectric conversion modules 34, 34 which are fixed and connected to both ends of the FFOC 32.

Photoelectric Conversion Module

The photoelectric conversion module 34 is provided with a FPC (flexible printed circuit) board 36. The FPC board 36 is composed of a flexible and translucent polyimide film 38 and a conductor pattern 40 which is provided on the polyimide film 38 and is formed of, e.g., metal such as copper, etc. The conductor pattern 40 includes, at an edge of the polyimide film 38, electrode terminals 42 to be connected to the connectors 22 and 24.

A photoelectric conversion element 44 and an IC (Integrated Circuit) chip 46 are, e.g., flip-chip-mounted on a surface of the FPC board 36 (on a mounting surface).

In more detail, in the photoelectric conversion module 34 connected to the connector 22 of the motherboard 18, the photoelectric conversion element 44 is a light-emitting element such as LD (laser diode), etc., and the IC chip 46 constitutes a driver circuit for driving the photoelectric conversion element 44. In other words, the photoelectric conversion module 34 connected to the connector 22 of the motherboard 18 is a transmitter.

Meanwhile, in the photoelectric conversion module 34 connected to the connector 24 of the sub-board 20 or 21, the photoelectric conversion element 44 is a light receiving element such as PD (photodiode), etc., and the IC chip 46 constitutes an amplifier circuit for amplifying an electric signal which is output from the light receiving element. In other words, the photoelectric conversion module 34 connected to the connector 24 of the sub-board 20 or 21 is a receiver.

In the first embodiment, each of the photoelectric conversion elements 44 is an array element including plural photoelectric conversion factors. Then, four IC chips 46 are mounted on each photoelectric conversion module 34 so as to correspond to the number of photoelectric conversion factors included in the photoelectric conversion element 44.

The photoelectric conversion element 44 is a surface-emitting type or a surface light-receiving type, and is arranged so that a light exit portion or a light incident portion faces the mounting surface. A filler member (underfill) formed of a translucent resin is provided between the photoelectric conversion element 44, the IC chips 46 and the FPC board 36 even though it is not illustrated.

In addition, the photoelectric conversion element 44 and the IC chips 46 are covered by a mold member formed of resin, even though it is not illustrated. The filler member and the mold member protect the IC chips 46 and the photoelectric conversion element 44 while ensuring connection strength between the IC chips 46, the photoelectric conversion element 44 and the FPC board 36.

FIG. 4 shows a schematic cross section of the photoelectric conversion module 34 with a portion of the FFOC 32.

The photoelectric conversion module 34 has a polymer optical waveguide member 50 integrally provided on a surface opposite to the mounting surface of the FPC board 36 (back side). The polymer optical waveguide member 50 covers substantially the entire back side of the FPC board 36.

In more detail, the polymer optical waveguide member 50 includes an under cladding layer 52, a core 54 and an over cladding layer 56. The under cladding layer 52 is laminated on the FPC board 36, and the core 54 having a rectangular cross section when viewed in a light transmission direction runs on the under cladding layer 52.

The number of cores 54 is four so as to correspond to the number of photoelectric conversion factors included in the photoelectric conversion element 44, and the over cladding layer 56 is laminated on the under cladding layer 52 and the core 54 such that the core 54 is surrounded by the over cladding layer 56 and the under cladding layer 52.

Materials of the under cladding layer 52, the core 54 and the over cladding layer 56 are not specifically limited, and it is possible to use, e.g., an acrylic resin, an epoxy resin and a polyimide resin, etc.

A retention groove connected to the core 54 is formed at an end of the polymer optical waveguide member 50 on the FFOC 32 side. The retention groove is, e.g., a U-groove having a rectangular cross section.

Here, the FFOC 32 includes plural optical fiber core wires 60. The optical fiber core wire 60 is composed of an optical fiber 61 and a coating 62 which coats an outer peripheral surface of the optical fiber 61. The optical fiber 61 is composed of a core 63 and a clad 64 which coats an outer peripheral surface of the core 63, and the coating 62 is formed of, e.g., a ultraviolet curable resin.

In the first embodiment, for example, the outer diameter of the optical fiber core wire 60 is 100 µm and that of the optical fiber 61 is 80 µm. Note that, the outer diameters of the optical fiber core wire 60 and of the optical fiber 61 are not limited thereto, and may be respectively 250 µm and 125 µm.

End portions of the optical fiber 61 where the coating 62 is removed protrude from both ends of the FFOC 32. And the end of the optical fiber 61 is fixed in the retention groove by using, e.g., an adhesive.

The optical fiber 61 is easy to adjust the refractive-index distribution thereof and is preferably formed of a resin in light of flexibility thereof. An end face of the core 63 of the optical fiber 61 is in contact with an end face of the core 54 of the polymer optical waveguide member 50, thereby optically coupling the core 63 to the core 54.

Meanwhile, a V-groove is formed on the polymer optical waveguide member 50 so as to be orthogonal to the core 54, and a vapor-deposited film formed of, e.g., metal such as Au is formed on a wall surface of the V-groove. The vapor-deposited film forms a mirror 66 which constitutes an optical component for optically coupling the photoelectric conversion element 44 to the front end surface of the optical fiber 61 via the FPC board 36.

On a surface of the polymer optical waveguide member 50 opposite to the FPC board 36, e.g., a plate-like glass reinforcement member 68 is adhered using an adhesive. The reinforcement member 68 covers at least the retention groove and firmly holds the end of the optical fiber 61.

Flexible Flat Optical Cable (FFOC)

FIG. 5 is a schematic plan view showing the FFOC 32.

The FFOC 32 has, e.g., four optical fiber core wires 60, e.g., eight copper conductors 70, and base sheets 72, 72 which sandwich the optical fiber core wires 60 and the conductors 70. In FIG. 5, one of the base sheets 72 is partially removed.

The optical fiber core wire 60 and the conductor 70 run in a longitudinal direction of the base sheet 72 and the optical fiber core wires 60 are separated from the conductors 70 in a width direction of the base sheet 72. In the first embodiment, the conductors 70 are arranged on both sides of the optical fiber core wires 60.

The coating 62 is removed at the both ends of the optical fiber core wire 60, thereby exposing ends of the optical fiber 61. The ends of the optical fiber 61 as well as the ends of the conductor 70 protrude from the both ends of the base sheet 72.

The both ends of the optical fiber 61 are optically coupled to the cores 54 of the photoelectric conversion modules 34, and the both ends of the conductor 70 are electrically coupled to the conductor patterns 40 of the photoelectric conversion modules 34. In detail, the both ends of the conductor 70 are connected to the back sides of the FPC boards 36 and are connected to the conductor patterns 40 via a through-hole conductor provided on the FPC boards 36.

Therefore, the FFOC 32 is a photoelectric composite type and provides transmission of electric signals or power and optical signals between the photoelectric conversion modules 34.

Figure 6:
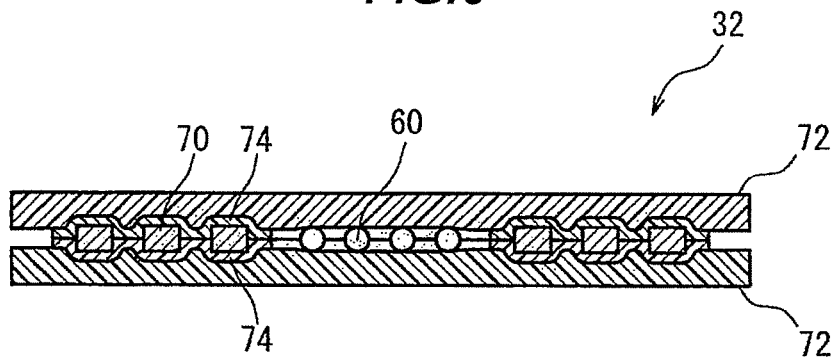
FIG. 6 is a schematic cross sectional view showing the FFOC taken along line VI-VI in FIG. 5.

FIG. 6 is a schematic horizontal cross sectional view showing the FFOC 32 taken along line VI-VI in FIG. 5. It should be noted that hatching for the optical fiber core wire 60 is omitted in FIG. 6.

The base sheet 72 is formed of one selected from the group consisting of, e.g., PET (polyethylene terephthalate), polyimide and polycarbonate, and has flexibility.

The base sheet 72 per se does not have adhesiveness or stickiness. Accordingly, an adhesive tape 74 having adhesiveness is attached to a surface (inner surface) of the base sheet 72 on the conductor 70 side.

The adhesive tape 74 is a double-sided tape in which, for example, an adhesive layer formed of one selected from the group consisting of acrylic, urethane and epoxy is provided on both surfaces of a base material formed of one selected from the group consisting of polyester, polypropylene and polyvinyl chloride.

The adhesive tape 74 forms an adhesive layer on the inner surface of the base sheet 72. In this regard, however, in the region of the base sheet 72 facing the conductor 70, the adhesive tape 74 is entirely attached, and in the region of the base sheet 72 facing the optical fiber core wire 60, the adhesive tape 74 is attached to the end portions. In other words, a region without the adhesive tape 74 (non-adhesive region) is present at the center of the inner surface of the base sheet 72, and the middle portion of the optical fiber core wire 60 is in contact with the non-adhesive region of the base sheet 72.

The FFOC 32 is manufactured, for example, as follows.

Figure 7A:
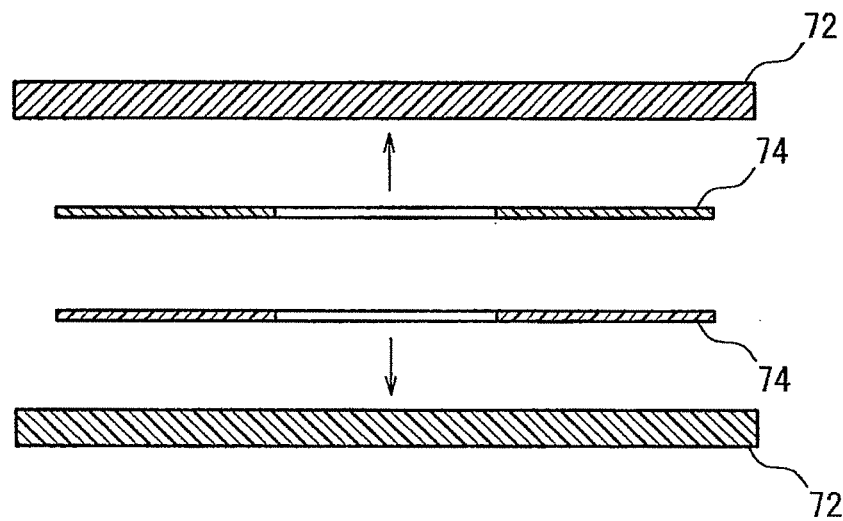
Figure 7B:
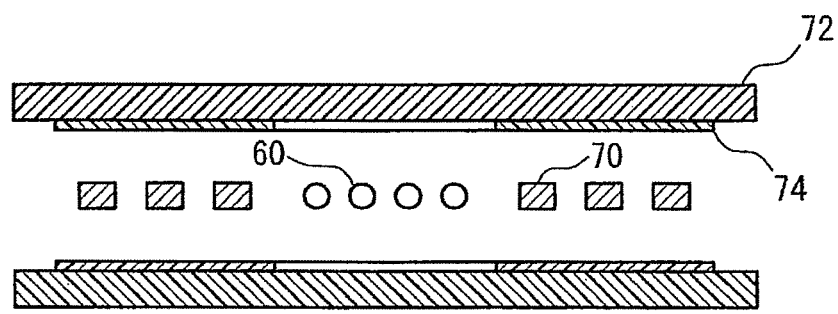

Firstly, as shown in FIG. 7A, the adhesive tape 74 having a predetermined shape is attached to the base sheet 72. Subsequently, as shown in FIG. 7B, the optical fiber core wires 60 and the conductors 70 which have a predetermined length are sandwiched by the base sheets 72 having the adhesive tape 74, thereby obtaining the FFOC 32.

Alternatively, the FFOC 32 may be manufactured by firstly attaching the adhesive tape 74 to a web sheet as a raw material of the base sheet 72, then sandwiching the optical fiber core wire 60 and the conductor 70 by the web sheet and finally cutting the web sheet.

In the FFOC 32 of the first embodiment, the optical fiber 61 is prevented from being damaged even if being bent 90° as is shown in FIG. 2. The reasons are stated below.

A portion being bent (i.e., a bend portion) 60a of the optical fiber core wire 60 is in contact with the non-adhesive region of the base sheet 72, and the non-adhesive region allows the bend portion of the optical fiber core wire 60 to move in a width direction of the base sheet 72.

Figure 8:
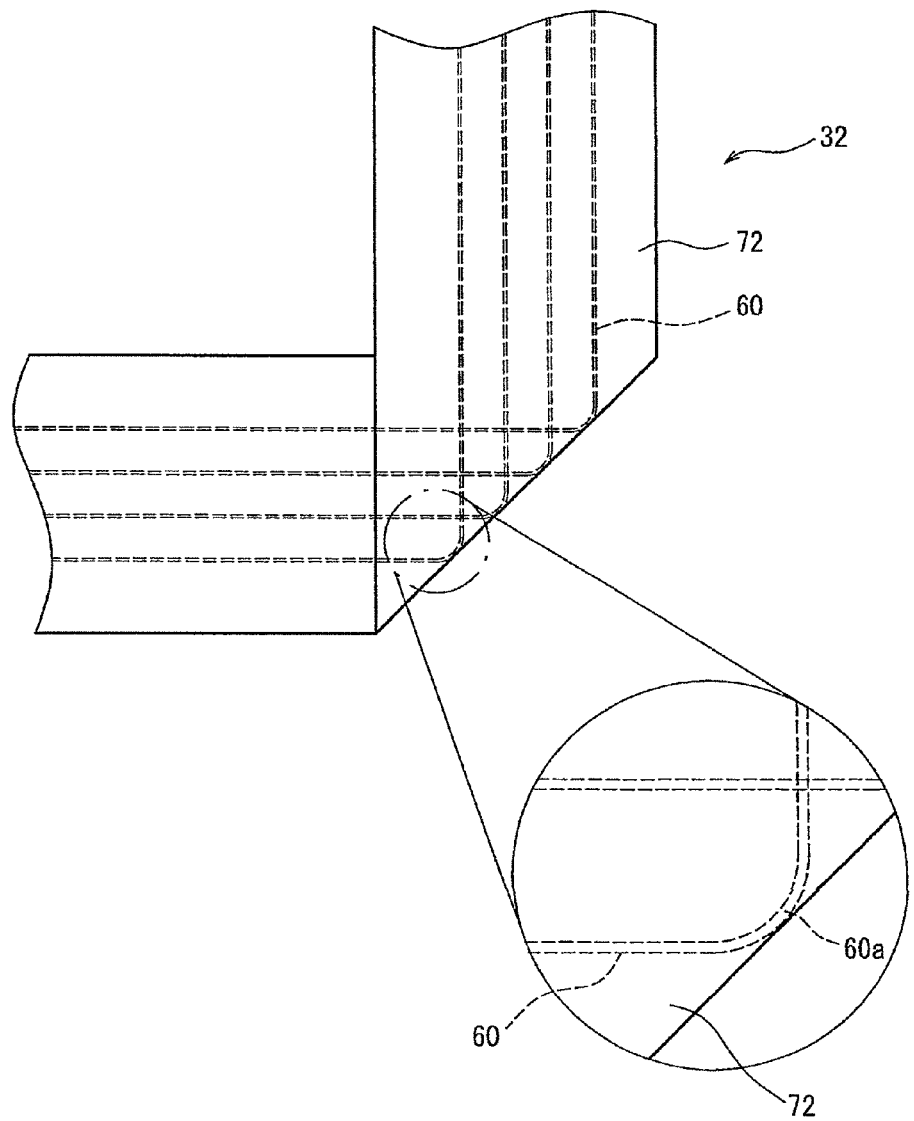
FIG. 8 is a plan view showing the FFOC for explaining a bend radius of a bend portion of the optical fiber core wire.

Accordingly, the bend portion 60a of the optical fiber core wire 60 is curved with somewhat large bend radius as shown in a circle of FIG. 8 in an enlarged manner. Stress is prevented from being concentrated on one place of the optical fiber core wire 60 due to the large bend radius, which prevents the optical fiber 61 from being damaged at the bend portion 60a of the optical fiber core wire 60.

Note that, the illustration of the conductor 70 is omitted in FIG. 8.

In addition, the FFOC 32 of the first embodiment is easy to manufacture since the adhesive layer is formed by attaching the adhesive tape 74 while simultaneously forming the non-adhesive region.

Second Embodiment

An FFOC 76 in a second embodiment will be described below. It should be noted that, in the following embodiments, the same constituent elements as those in the first embodiment are denoted by the same reference numerals and explanations thereof will be omitted.

Figure 9:
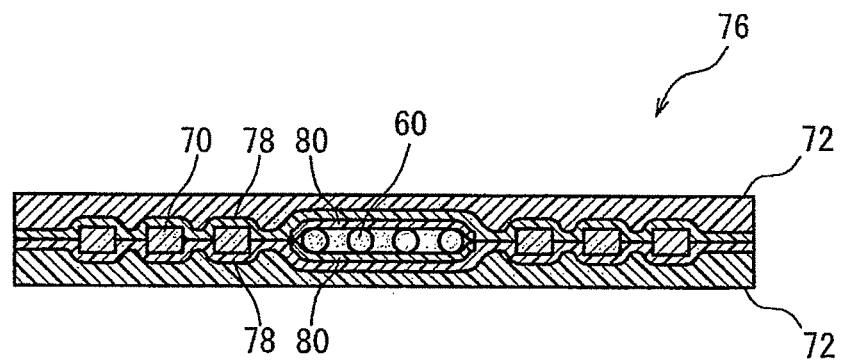
FIG. 9 is a schematic cross sectional view showing an FFOC in a second embodiment.

FIG. 9 is a schematic cross sectional view showing the FFOC 76, which corresponds to FIG. 6. In the FFOC 76, an adhesive layer 78 is integrally formed on the entire inner surface of the base sheet 72. The adhesive layer 78 is formed of one selected from the group consisting of, e.g., acrylic, urethane and epoxy.

Then, a non-adhesive tape 80 is attached to a surface of the adhesive layer 78 opposite to the base sheet 72. The non-adhesive tape 80 has a length and a width which are sufficient to cover the middle portion of the plural optical fiber core wires 60.

The non-adhesive tape 80 is formed of one selected from the group consisting of, e.g., polyethylene terephthalate, polyester and polypropylene, and does not have adhesiveness. Therefore, the non-adhesive region in the FFOC 76 is formed on the surface of the adhesive layer 78 by the non-adhesive tape 80.

The FFOC 76 is manufactured, for example, as follows.

Figure 10A:
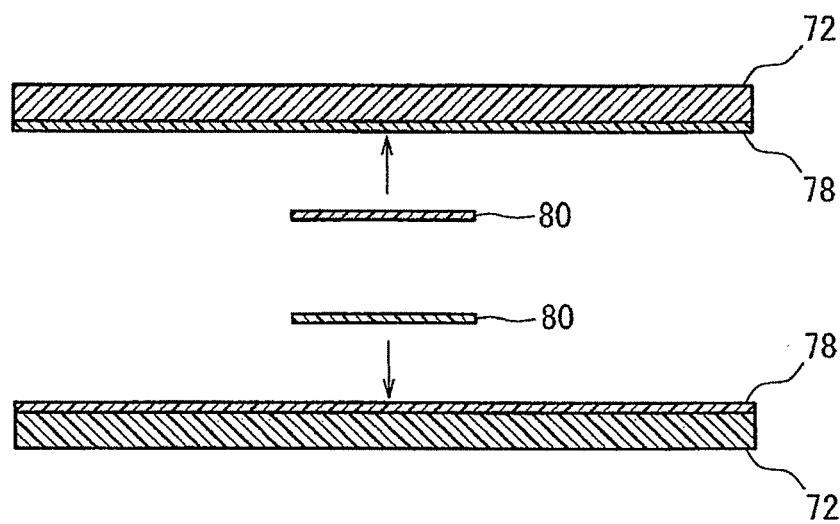
Figure 10B:
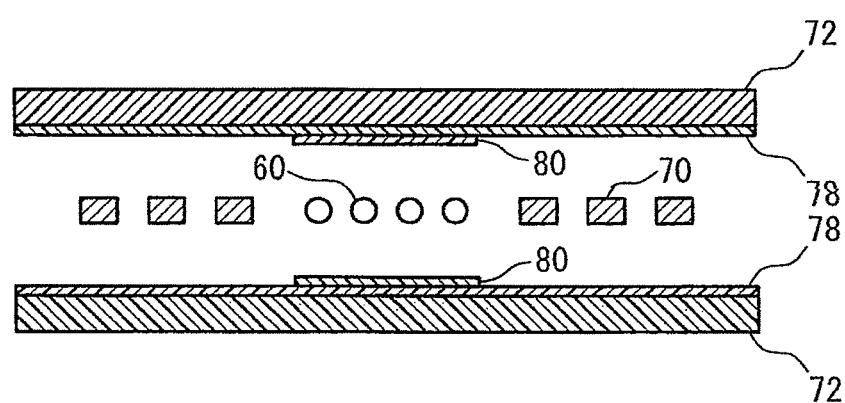

Firstly, as shown in FIG. 10A, the non-adhesive tape 80 is attached to the surface of the base sheet 72 having the adhesive layer 78 thereon. Subsequently, the optical fiber core wires 60 and the conductors 70 are sandwiched by the base sheets 72 as shown in FIG. 10B, thereby obtaining the FFOC 76.

Also in the FFOC 76 of the second embodiment, the non-adhesive region allows the bend portion 60a of the optical fiber core wire 60 to move in the width direction of the base sheet 72. This results in that damage to the optical fiber 61 at the bend portion 60a of the optical fiber core wire 60 is suppressed.

In addition, the FFOC 76 of the second embodiment is easy to manufacture since the non-adhesive region is formed by attaching the non-adhesive tape 80.

Third Embodiment

An FFOC 82 in a third embodiment will be described below.

Figure 11:
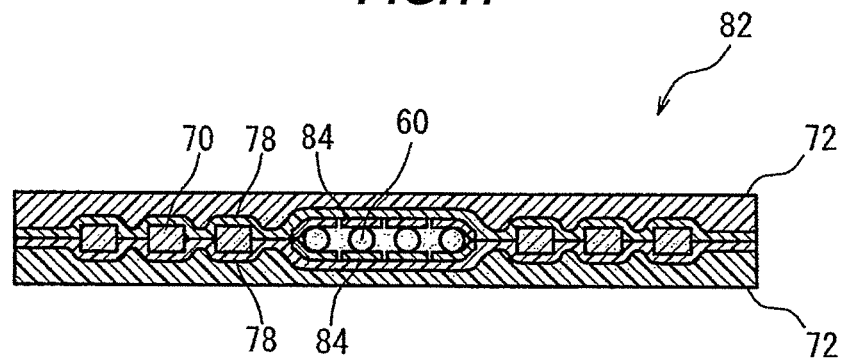
FIG. 11 is a schematic cross sectional view showing an FFOC in a third embodiment.

The FFOC 82 is different from the FFOC 76 in that a non-adhesive tape 84 is provided for each of the optical fiber core wires 60 as shown in FIG. 11.

Figure 12A:
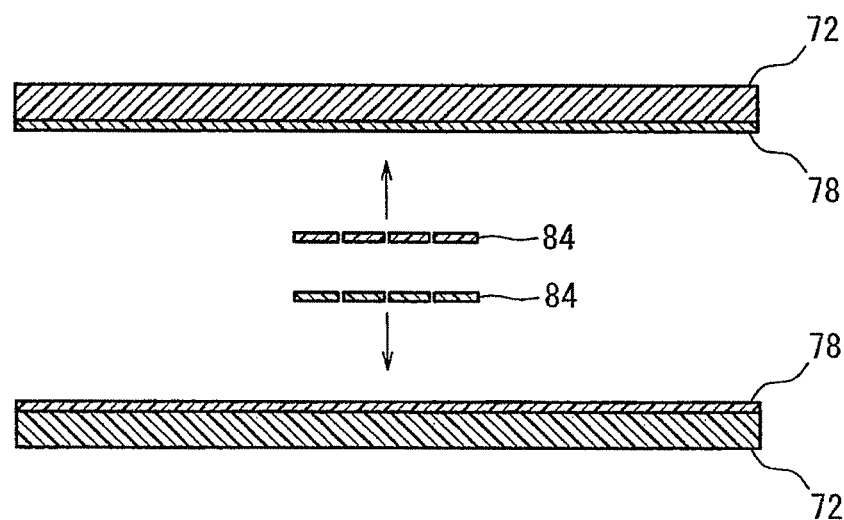
FIGS. 12A and 12B are explanatory diagrams illustrating a method of manufacturing the FFOC in FIG. 11, wherein FIG.
Figure 12B:
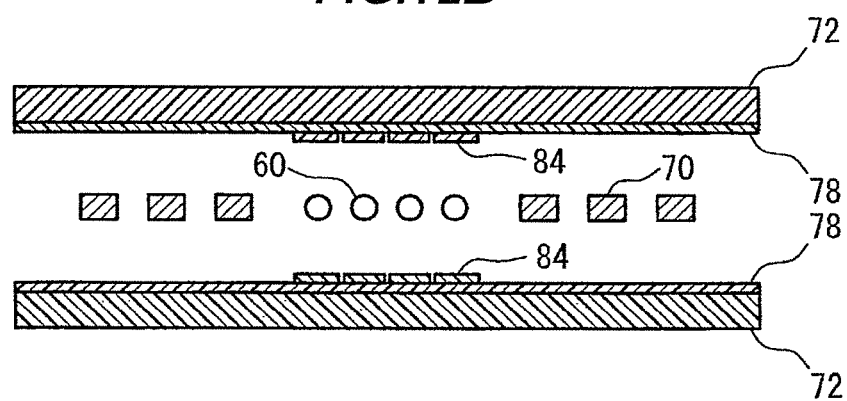

For manufacturing the FFOC 82, plural non-adhesive tapes 84 are attached to the adhesive layer 78 as shown in FIGS. 12A and 12B.

Also in the FFOC 82 of the third embodiment, the non-adhesive region allows the bend portion 60a of the optical fiber core wire 60 to move in the width direction of the base sheet 72. This results in that damage to the optical fiber 61 at the bend portion 60a of the optical fiber core wire 60 is suppressed.

Fourth Embodiment

An FFOC 86 in a fourth embodiment will be described below.

Figure 13:
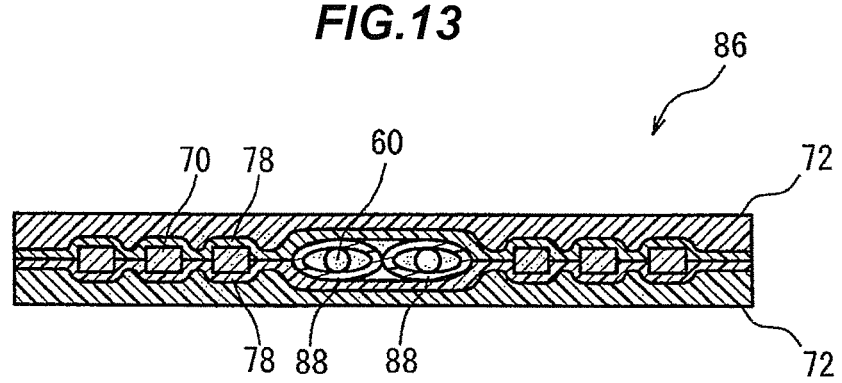
FIG. 13 is a schematic cross sectional view showing an FFOC in a fourth embodiment.

In the FFOC 86, a portion of the optical fiber core wire 60 is covered by a loose tube 88 as shown in FIG. 13, instead of attaching the non-adhesive tape 80 or 84. The loose tube 88 is formed of, e.g., a fluorine resin and does not have adhesiveness. In more detail, the loose tube 88 is formed of one selected from the group consisting of PTFE (polytetrafluoroethylene) and PFA (tetra-fluoroethylene perfluoroalkyl vinyl ether copolymer). In addition, the inner diameter of the loose tube 88 is much larger than the diameter of the optical fiber core wire 60. Thus, the non-adhesive region of the FFOC 86 is formed on the surface of the adhesive layer 78 by the loose tube 88.

Figure 14:
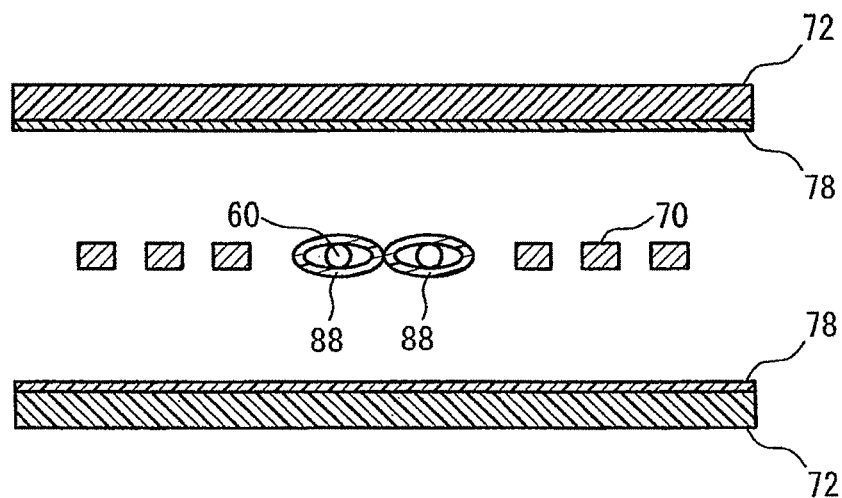
FIG. 14 is an explanatory diagram illustrating a method of manufacturing the FFOC in FIG. 13, wherein a step of sandwiching optical fiber core wires and conductors between the base sheets is shown.

For manufacturing the FFOC 86, the loose tubes 88 having the optical fiber core wire 60 inserted thereinto are sandwiched together with the conductors 70 by the base sheets 72, as shown in FIG. 14.

In the FFOC 86 of the fourth embodiment, the non-adhesive region formed by the loose tube 88 allows the bend portion 60a of the optical fiber core wire 60 to move in the width direction of the base sheet 72. This results in that damage to the optical fiber 61 at the bend portion 60a of the optical fiber core wire 60 is suppressed.

In addition, the FFOC 86 is easy to manufacture since the non-adhesive region is formed by the loose tube 88.

Note that, as shown in FIGS. 13 and 14, the number of the optical fiber core wires 60 is not limited to four and is not specifically limited.

Fifth Embodiment

An FFOC 90 in a fifth embodiment will be described below.

Figure 15:
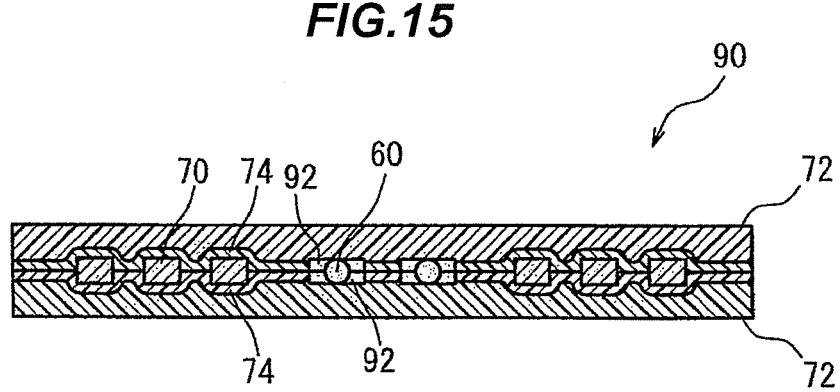
FIG. 15 is a schematic cross sectional view showing an FFOC in a fifth embodiment.

In the FFOC 90, grooves 92 are formed on the adhesive layer 78 as shown in FIG. 15, instead of attaching the non-adhesive tape 80 or 84. The groove 92 reaches the base sheet 72 and a bottom surface of the groove 92 is formed by the base sheet 72. For manufacturing the FFOC 90, the grooves 92 are formed on the adhesive layer 78 as shown in FIG. 16A, and the optical fiber core wires 60 and the conductors 70 are then sandwiched by the base sheets 72 as shown in FIG. 16B.

In the FFOC 90 of the fifth embodiment, the non-adhesive region formed by the groove 92 allows the bend portion 60a of the optical fiber core wire 60 to move in the width direction of the base sheet 72. This results in that damage to the optical fiber 61 at the bend portion 60a of the optical fiber core wire 60 is suppressed.

Figure 17:
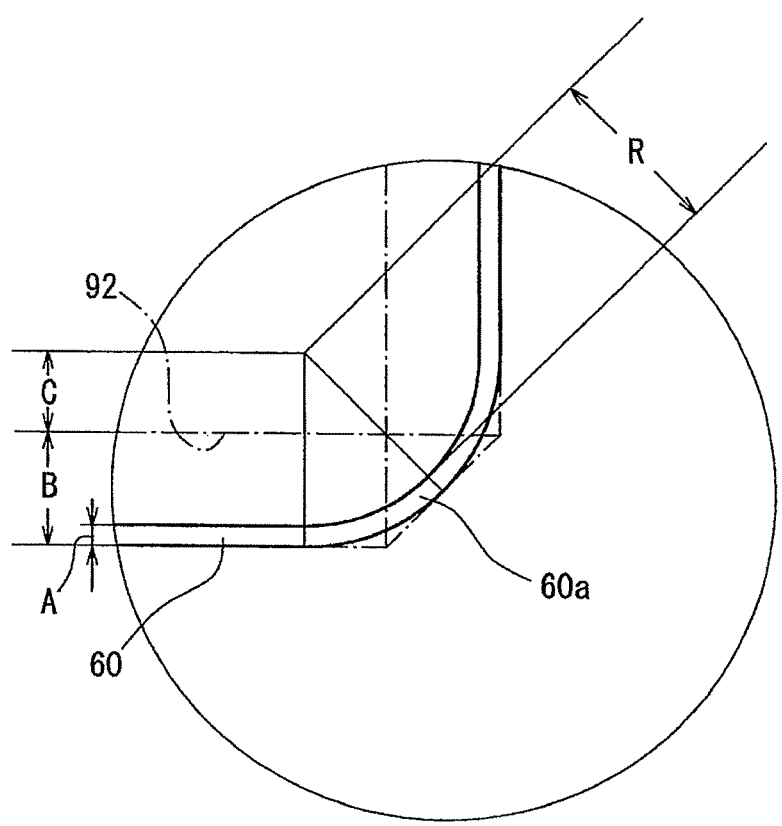
FIG. 17 is a diagram illustrating the FFOC in FIG. 15 for explaining a bend radius of a bend portion of the optical fiber core wire.

Here, FIG. 17 is an explanatory diagram illustrating magnitude of bend radius R of the bend portion 60a in the FFOC 90.

The bend radius R is expressed by the following formulas (1) and (2), where a width of the groove 92, i.e., a width of the non-adhesive region is B, a diameter (outer diameter) of the optical fiber core wire 60 is A and a constant number is C.

Formula $$R = C + B - A \quad (1)$$

$$R = \sqrt{2}\,C + \frac{\sqrt{2}}{2} B - A \quad (2)$$

When C is deleted from the formulas (1) and (2), the bend radius R is a function of the width B of the non-adhesive region and the diameter A of the optical fiber core wire 60.

As an example, when the diameter A of the optical fiber core wire 60 is 100 μm, the material of the optical fiber 61 is glass and probability of fatigue failure is not less than 10 years, the bend radius R is preferably not less than 4 mm. In this case, the width B is determined to be, e.g., 4 mm.

However, it is not limited thereto. The width B only needs to be determined to satisfy the required bend radius R which is determined depending on the diameter A of the optical fiber core wire 60, the material of the optical fiber 61 and the required probability of fatigue failure.

When the formulas (1) and (2) are applied to the FFOC 32 of the first embodiment and the FFOC 76 of the second embodiment, a pitch of the optical fiber core wires 60 (center-to-center distance) corresponds to the width B of the non-adhesive region. When applied to the FFOC 82 of the third embodiment, the width of the non-adhesive tape 84 corresponds to the width B of the non-adhesive region. In addition, when applied to the FFOC 90 of the fourth embodiment, the width of the loose tube 88 in a compressed state corresponds to the width B of the non-adhesive region.

Sixth Embodiment

An FFOC 94 in a sixth embodiment will be described below.

Figure 18:
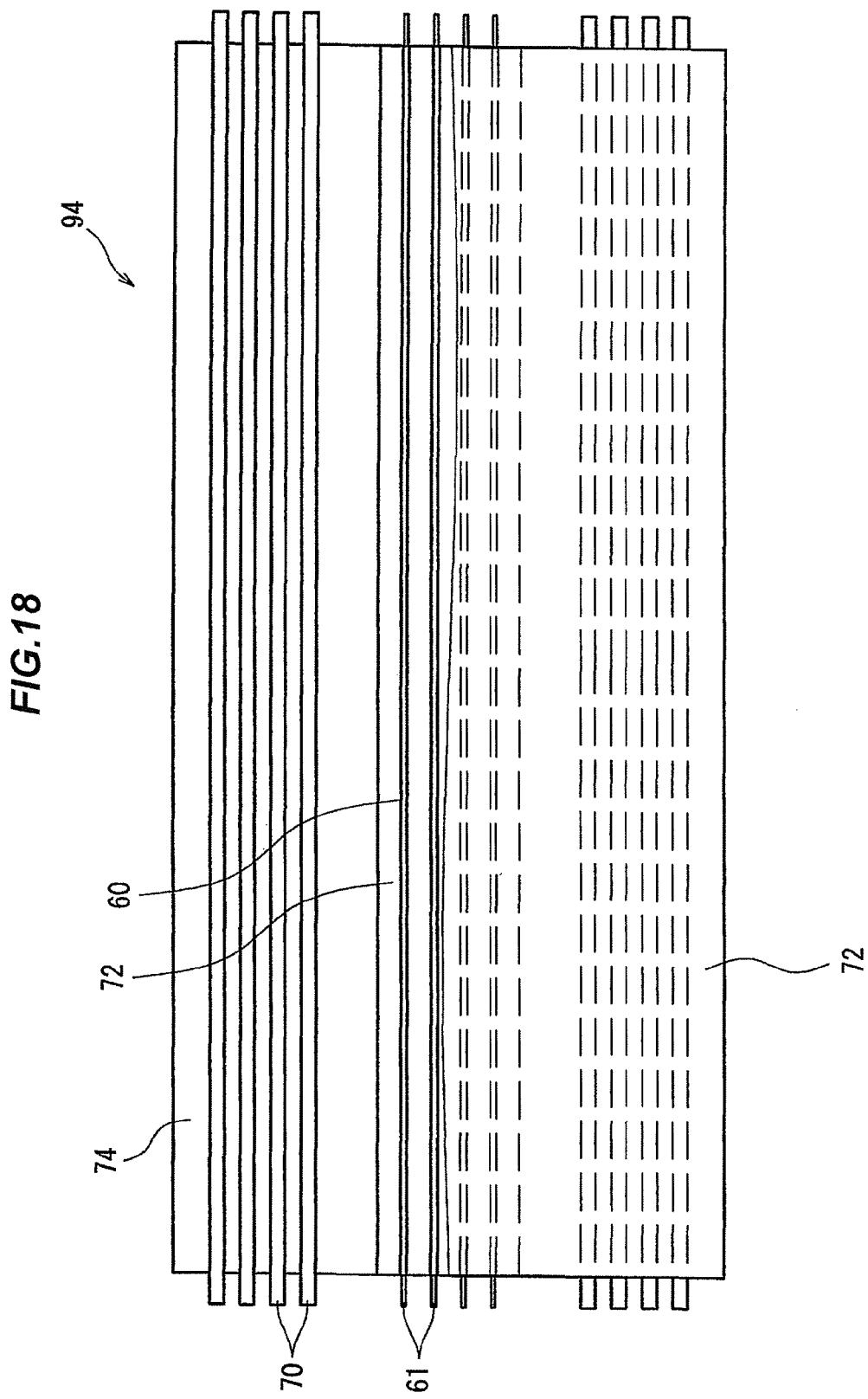
FIG. 18 is a schematic plan view showing an FFOC in a sixth embodiment, wherein one of base sheets is partially removed.

As shown in FIG. 18, the adhesive tape 74 may not be provided at the both ends of the region on the inner surface of the base sheet 72 in contact with the optical fiber core wire 60. However, in order to suppress flapping of the ends of the optical fiber core wires 60, it is preferable that the adhesive tape 74 be provided also at the both ends of the region on the inner surface of the base sheet 72 in contact with the optical fiber core wire 60.

Seventh Embodiment

An FFOC 96 in a seventh embodiment will be described below.

Figure 19:
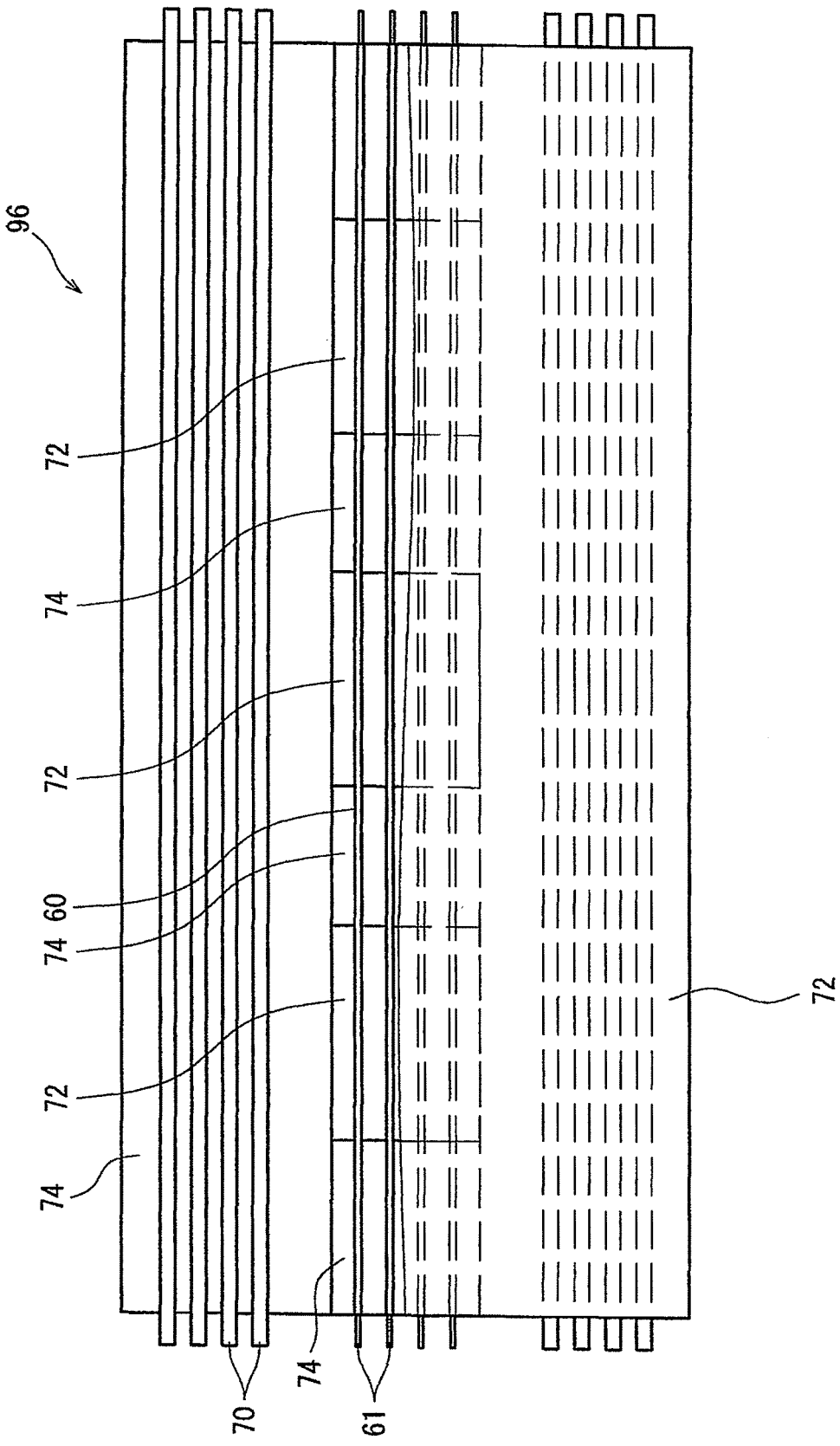
FIG. 19 is a schematic plan view showing an FFOC in a seventh embodiment, wherein one of base sheets is partially removed.

As shown in FIG. 19, the adhesive tape 74 may be divided and provided in plural positions in the region on the inner surface of the base sheet 72 in contact with the optical fiber core wire 60. In this case, unnecessary displacement of the optical fiber core wire 60 is suppressed.

Eighth Embodiment

An FFOC 98 in an eighth embodiment will be described below.

Figure 20:
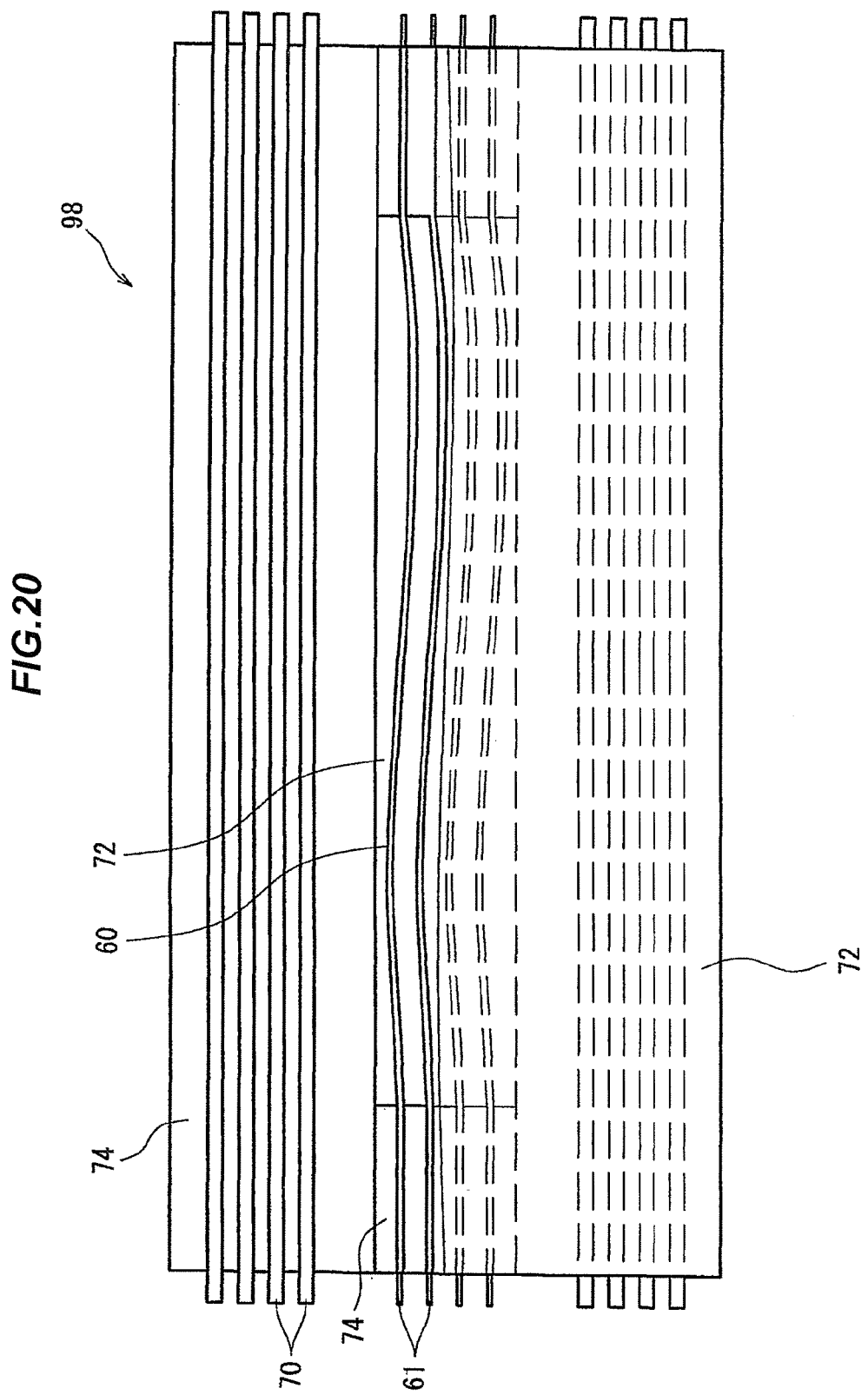
FIG. 20 is a schematic plan view showing an FFOC in an eighth embodiment, wherein one of base sheets is partially removed.

As shown in FIG. 20, the middle portion of the optical fiber core wire 60 may be waved so that the length of the portion of the optical fiber core wire 60 sandwiched by the base sheets 72 is greater than the length of the base sheet 72.

In this case, having an excess length of the optical fiber core wire 60 allows the bend portion 60a of the optical fiber core wire 60 to move easily. Especially, adequate magnitude of bend radius R is ensured at the bend portion 60a even when, e.g., the FFOC 98 is bent 180° as folded in two to adjust the excess length thereof, which suppresses damage to the optical fiber 61 at the bend portion 60a.

The present invention is not to be limited to the first to eighth embodiments, and includes appropriate combinations thereof or modifications thereof.

For example, the FFOCs 32, 76, 82, 86, 90, 94, 96 and 98 (hereinafter referred to as "FFOCs 32, etc.") in the first to eighth embodiments may not include the conductor 70 depending on the intended use. However, since the conductor 70 has a function of retaining the bend shape, it is preferable that an FFOC include a shape-retaining member formed of metal or paper, etc., in case of not including the conductor 70. The shape-retaining member may be either in a linear or strip shape.

Once the FFOC including the shape-retaining member is bent, the bend posture is retained by the shape-retaining member. This prevents repetition of bending and unintentional bending, thereby reducing the possibility of damage to the optical fiber 61.

In the FFOCs 32, etc., of the first to eighth embodiments, the non-adhesive region may have some adhesiveness as long as it allows the optical fiber core wire 60 to move. In case that the non-adhesive region has some adhesiveness, flapping of the optical fiber core wire 60 is suppressed and workability is improved.

Although the optical fiber core wire 60 having the coating 62 is used for the FFOCs 32, etc., in the first to eighth embodiments, an optical fiber core wire may not have the coating 62. In other words, the optical fiber core wire may be an optical fiber per se.

Lastly, it is obvious that the flexible flat optical cable of the invention can be used for information processing equipments such as cellular phone, network equipments, digital AV (audio-visual) equipments and home electric appliances.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A flexible flat optical cable, comprising:
two flexible base sheets;
one or more optical fiber core wires having a bending radius R arranged between the base sheets and each comprising at least an optical fiber;
a shape retaining member provided between the base sheets and separated from the optical fiber core wires in a width direction of the base sheets to retain a shape of the base sheets, the shape retaining member comprising portions arranged on both sides of the optical fiber core wires;
an adhesive layer comprising a double-sided tape and being provided in a region of the base sheets facing to the shape retaining member and end portions of the base sheets in a region of the base sheets facing the optical fiber core wires and contacting a widthwise metal surface of the shape retaining member such that the shape retaining member is bonded to the base sheets via the adhesive layer,
wherein a non-adhesive region is formed on a surface of the base sheets or the adhesive layer adjacent, in a thickness direction of the base sheets, to at least a portion of the optical fiber core wires for allowing the portion of the optical fiber core wires to move in a width direction, and a width of the non-adhesive region being at least a length B which is expressed by $B>(2-\sqrt{2})(R+A)$ wherein A is an outer diameter of the optical fiber core wire such that the non-adhesive region can allow the one or more optical fiber cores to move in a widthwise direction when the flexible flat optical cable is bent 90° without being bent around a radius smaller than R,
wherein the non-adhesive region contains only said one or more optical fiber core wires, and
wherein the portions of the shape retaining member arranged on the both sides of the optical fiber core wires are spaced apart from the optical fiber core wires in the width direction of the base sheets via the adhesive layer.

2. The flexible flat optical cable according to claim 1, wherein the non-adhesive region is formed directly on the surface of the base sheets.

3. The flexible flat optical cable according to claim 1, wherein the non-adhesive region is formed by a non-adhesive tape on the surface of the adhesive layer.

4. The flexible flat optical cable according to claim 1, wherein the non-adhesive region is formed by a tube surrounding a portion of the optical fiber core wires.

5. The flexible flat optical cable according to claim 1, wherein the optical fiber core wires extend outward from an end of the base sheets, and a part of the optical fiber core wires at the end of the base sheets is fixed by the adhesive layer.

6. The flexible flat optical cable according to claim 1, wherein the optical fiber core wires comprise a resin.

7. The flexible flat optical cable according to claim 1, wherein the non-adhesive region is divided into a plurality of zones in a longitudinal direction of the base sheets by the adhesive layer.

8. The flexible flat optical cable according to claim 1, wherein the optical fiber core wires disposed between the base sheets have a length greater than the base sheet.

9. A flexible flat optical cable, comprising:
two flexible base sheets;
one or more optical fiber core wires having a bending radius R arranged between the base sheets and each comprising at least an optical fiber;
a shape retaining member provided between the base sheets and separated from the optical fiber cores in a width direction of the base sheets to retain a shape of the base sheets, the shape retaining member comprising portions arranged on both sides of the optical fiber core wires;
an adhesive layer comprising a double-sided tape and being provided in a region of the base sheets facing to the shape retaining member and end portions of the base sheets in a region of the base sheets facing the optical fiber core wires and directly contacting a widthwise metal surface of the shape retaining member such that the shape retaining member is bonded to the base sheets via the adhesive layer,
wherein a non-adhesive region is formed on a surface of the base sheets or the adhesive layer adjacent, in a thickness direction of the base sheets, to at least a portion of the optical fiber core wires for allowing the portion of the optical fiber core wires to move in a width direction, and a width of the non-adhesive region being at least a length B which is expressed by $B>(2-\sqrt{2})(R+A)$ wherein A is an outer diameter of the optical fiber core wire such that the non-adhesive region can allow the one or more optical fiber cores to move in a widthwise direction when the flexible flat optical cable is bent 90° without being bent around a radius smaller than R,
wherein the non-adhesive region contains only said one or more optical fiber core wires, and
wherein the portions of the shape retaining member arranged on both sides of the optical fiber core wires are spaced apart from the optical fiber core wires in the width direction of the base sheets via the adhesive layer.

10. The flexible flat optical cable according to claim 1, wherein the shape retaining member comprises a conductor.

11. The flexible flat optical cable according to claim 1, wherein the adhesive layer encloses the shape retaining member.

12. The flexible flat optical cable according to claim 1, wherein the adhesive is bonded between the base sheets, and the shape retaining member is bonded to the base sheets via the adhesive layer provided therebetween.

13. The flexible flat optical cable according to claim 1, wherein the shape retaining member is absent between adjacent optical core wires.

14. The flexible flat optical cable according to claim 9, wherein the shape retaining member is absent between adjacent optical core wires.

15. A flexible flat optical cable, comprising:
two flexible base sheets;
one or more optical fiber core wires arranged between the base sheets and each comprising at least an optical fiber; and
an adhesive layer comprising a double-double sided tape and being provided between the base sheets to bond the base sheets at both sides of a width direction of the optical fiber core wires and at end portions of a longitudinal direction of the optical fiber core wires,
wherein a non-adhesive region is formed on a surface of the base sheets or the adhesive layer adjacent, in a thickness direction of the base sheets, to at least a portion of the optical fiber core wires for allowing a portion of the optical fiber core wires to move in a width direction, and a width of the non-adhesive region being at least a length B which is expressed by $B>(2-\sqrt{2})(R+A)$ wherein A is an outer diameter of the optical fiber core wire such that the non-adhesive region can allow the one or more optical fiber cores to move in a widthwise direction when the flexible flat optical cable is bent 90° without being bent around a radius smaller than R, and
wherein the non-adhesive region contains only said one or more optical fiber core wires.

16. The flexible flat optical cable according to claim 1, wherein the double-sided tape comprises a tape formed with a hole penetrating therethrough.

* * * * *